United States Patent
Joo et al.

(10) Patent No.: US 8,805,024 B2
(45) Date of Patent: Aug. 12, 2014

(54) MOTION CAPTURE APPARATUS AND METHOD

(75) Inventors: Han-Byul Joo, Daejeon (KR); Seong-Jae Lim, Gwangju (KR); Ji-Hyung Lee, Daejeon (KR); Bon-Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 228 days.

(21) Appl. No.: 13/335,120

(22) Filed: Dec. 22, 2011

(65) Prior Publication Data

US 2012/0163675 A1 Jun. 28, 2012

(30) Foreign Application Priority Data

Dec. 22, 2010 (KR) .................. 10-2010-0132882

(51) Int. Cl.
*G06K 9/00* (2006.01)
(52) U.S. Cl.
USPC .......................................... 382/107; 382/103
(58) Field of Classification Search
None
See application file for complete search history.

(56) References Cited

U.S. PATENT DOCUMENTS

| | | | |
|---|---|---|---|
| 6,222,560 B1* | 4/2001 | Naka et al. ............. | 345/474 |
| 6,388,670 B2* | 5/2002 | Naka et al. ............. | 345/474 |
| 6,842,638 B1* | 1/2005 | Suri et al. .............. | 600/425 |
| 2005/0063596 A1* | 3/2005 | Yomdin et al. ......... | 382/232 |
| 2008/0031512 A1* | 2/2008 | Mundermann et al. .. | 382/154 |
| 2009/0136103 A1* | 5/2009 | Sonka et al. ........... | 382/128 |
| 2009/0232353 A1* | 9/2009 | Sundaresan et al. .... | 382/103 |
| 2011/0148875 A1* | 6/2011 | Kim et al. .............. | 345/420 |
| 2012/0163675 A1* | 6/2012 | Joo et al. ............... | 382/107 |

FOREIGN PATENT DOCUMENTS

KR    10-0808543 B1    2/2008

OTHER PUBLICATIONS

Juergen Gall, et al; "Motion Capture Using Joint Skeleton Tracking and Surface Estimation", Computer Vision and Pattern Recogniton, 2009, CVPR 2009, IEEE Conference on; Jun. 20-25, 2009, pp. 1746-1753; Date of Current Version: Aug. 18, 2009.

* cited by examiner

*Primary Examiner* — Nancy Bitar
(74) *Attorney, Agent, or Firm* — Ladas & Parry LLP

(57) ABSTRACT

Disclosed herein is a motion capture apparatus and method. The motion capture apparatus includes a three-dimensional (3D) appearance reconstruction unit for reconstructing a 3D appearance of an entity using a multi-view image obtained by capturing the entity at a T+1-th frame. A 3D skeleton generation unit generates a 3D skeleton of the T+1-th frame using the 3D appearance and a model of the entity having a motion of a T-th frame. A motion reconstruction unit reconstructs a motion of the T+1-th frame of the model by changing the motion of the model based on the 3D skeleton of the T+1-th frame.

16 Claims, 7 Drawing Sheets

MOTION CAPTURE APPARATUS AND METHOD

CROSS REFERENCE TO RELATED APPLICATION

This application claims the benefit of Korean Patent Application No. 10-2010-0132882, filed on Dec. 22, 2010, which is hereby incorporated by reference in its entirety into this application.

BACKGROUND OF THE INVENTION

1. Technical Field

The present invention relates generally to a motion capture apparatus and method and, more particularly, to a motion capture apparatus and method, which generate a three-dimensional (3D) skeleton using a reconstructed 3D appearance and information about a previous frame, and search for global feature points, so that the precision of motion reconstruction is improved and the accumulation of errors is reduced, thus enabling complicated motion to be reconstructed and a long sequence of motions to be reconstructed.

2. Description of the Related Art

Prior technology for acquiring motion information about entities which engage in dynamic motion can be mainly classified into two types of methods.

First, there is a method using markers. As conventional motion reconstruction techniques, there have been mainly used methods of attaching markers to the appearance of an entity, the motion information of which is desired to be acquired, tracking the locations of the markers per frame, and then obtaining motion information. The motion information obtained using the markers undergoes a manual procedure that supplements erroneous portions caused by occlusion, sensor errors, etc., and then a final result is obtained. Such a marker-based method is advantageous in that relatively high precision can be obtained, but is disadvantageous in that a large number of markers must be attached to the appearance of an entity, expensive motion capture equipment must be provided, and the post-processing of the captured markers is required.

As the other method of reconstructing the motion of a dynamic entity, there is a marker-free method that does not use markers. This is also referred to as a markerless method. Compared to the above method using markers, the method that does not use markers is advantageous in that since there is no need to attach markers, capturing is conveniently performed, and in that since only an image sensor is used instead of expensive equipment in most cases, an advantage of low cost can be obtained from the standpoint of price. However, there is a disadvantage in that in the case of a complicated motion, it is difficult to extract exact motion.

Marker-free motion reconstruction algorithms can be mainly classified into two types depending on whether preliminary human model information has been used.

The first type is a model-free approach method that does not use a model. This method is configured such that a three-dimensional (3D) pose is extracted based on an image in most cases. This model-free approach method is divided into a bottom-up approach method that primarily finds the arms and legs of a body and extracts motion using probabilistic assemblies, and an example-based approach method that detects a pose by directly matching an image with a 3D pose on the basis of a pre-stored database (DB). However, the model-free approach method is disadvantageous in that in a complicated case, precision is poor, and, in particular, the example-based approach method is disadvantageous in that extractable motion is limited depending on DBs.

The second type is an approach method that uses a predefined model. In this case, appearance information about a predefined model, as well as kinematic information about the predefined model, can be utilized. Further, motion can be extracted by comparing a preliminary model with entities in an image or with a 3D volume entity obtained from a multi-view image via voxel reconstruction or the like. Compared to the existing model free method, this approach makes it possible to extract even a relatively complicated motion. However, even in this approach, how to derive corresponding relationships between a model and a 3D entity still remains the principal issue. Since most of the conventional approach methods depend on local optimization, the phenomenon of error accumulation is very prominent. Therefore, the existing approach methods are problematic in that in the case of a long sequence image containing complicated motion, it is impossible to complete the tracking of the image, and the motion may fail to be reconstructed because of the accumulation of errors during the tracking.

SUMMARY OF THE INVENTION

An object of the present invention is to provide a motion capture apparatus and method, which generate a three-dimensional (3D) skeleton using a reconstructed 3D appearance and information about a previous frame, and search for global feature points, so that the precision of motion reconstruction is improved and the accumulation of errors is reduced, thus enabling complicated motion to be reconstructed and a long sequence of motions to be reconstructed.

In accordance with an aspect of the present invention, there is provided a motion capture apparatus, including a three-dimensional (3D) appearance reconstruction unit for reconstructing a 3D appearance of an entity using a multi-view image obtained by capturing the entity at a T+1-th frame; a 3D skeleton generation unit for generating a 3D skeleton of the T+1-th frame using the 3D appearance and a model of the entity having a motion of a T-th frame; and a motion reconstruction unit for reconstructing a motion of the T+1-th frame of the model by changing the motion of the model based on the 3D skeleton of the T+1-th frame.

Preferably, the 3D appearance reconstruction unit may set a portion of the multi-view image corresponding to an area of the entity to a foreground, separate the foreground from a background, aggregate pieces of information about silhouettes and information about matching of colors of the foreground and the background, and then reconstruct the 3D appearance of the entity.

Preferably, the motion reconstruction unit may include a feature point search unit for searching the 3D skeleton for global feature points that enable a 3D location to be measured; a corresponding point derivation unit for deriving corresponding points of the model matching the global feature points; and a motion change unit for changing the motion of the model based on the corresponding points.

Preferably, the 3D skeleton generation unit may include a cross-section generation unit for generating a cross-section of the model of the entity having the motion of the T-th frame and a cross-section of the 3D appearance of the entity in a direction of a normal line relative to a longitudinal direction of a skeleton of the model of the entity; an ellipse fitting unit for generating an ellipse by elliptically fitting the cross-section of the model; and a skeleton location estimation unit for searching for an optimal location of the ellipse based on the cross-section of the 3D appearance, thus estimating a location of the skeleton of the model.

In accordance with another aspect of the present invention, there is provided a motion capture method, including reconstructing a three-dimensional (3D) appearance of an entity using a multi-view image obtained by capturing the entity at a T+1-th frame; generating a 3D skeleton of the T+1-th frame using the 3D appearance and a model of the entity having a motion of a T-th frame; and reconstructing a motion of the T+1-th frame of the model by changing the motion of the model based on the 3D skeleton of the T+1-th frame.

Preferably, the reconstructing the 3D appearance may include setting a portion of the multi-view image corresponding to an area of the entity to a foreground, separating the foreground from a background, aggregating pieces of information about silhouettes and information about matching of colors of the foreground and the background, and then reconstructing the 3D appearance of the entity.

Preferably, the reconstructing the motion may include searching the 3D skeleton for global feature points that enable a 3D location to be measured; deriving corresponding points of the model matching the global feature points; and changing the motion of the model based on the corresponding points.

Preferably, the generating the 3D skeleton may include generating a cross-section of the model of the entity having the motion of the T-th frame and a cross-section of the 3D appearance of the entity in a direction of a normal line relative to a longitudinal direction of a skeleton of the model of the entity; generating an ellipse by elliptically fitting the cross-section of the model; and searching for an optimal location of the ellipse based on the cross-section of the 3D appearance, thus estimating a location of the skeleton of the model.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
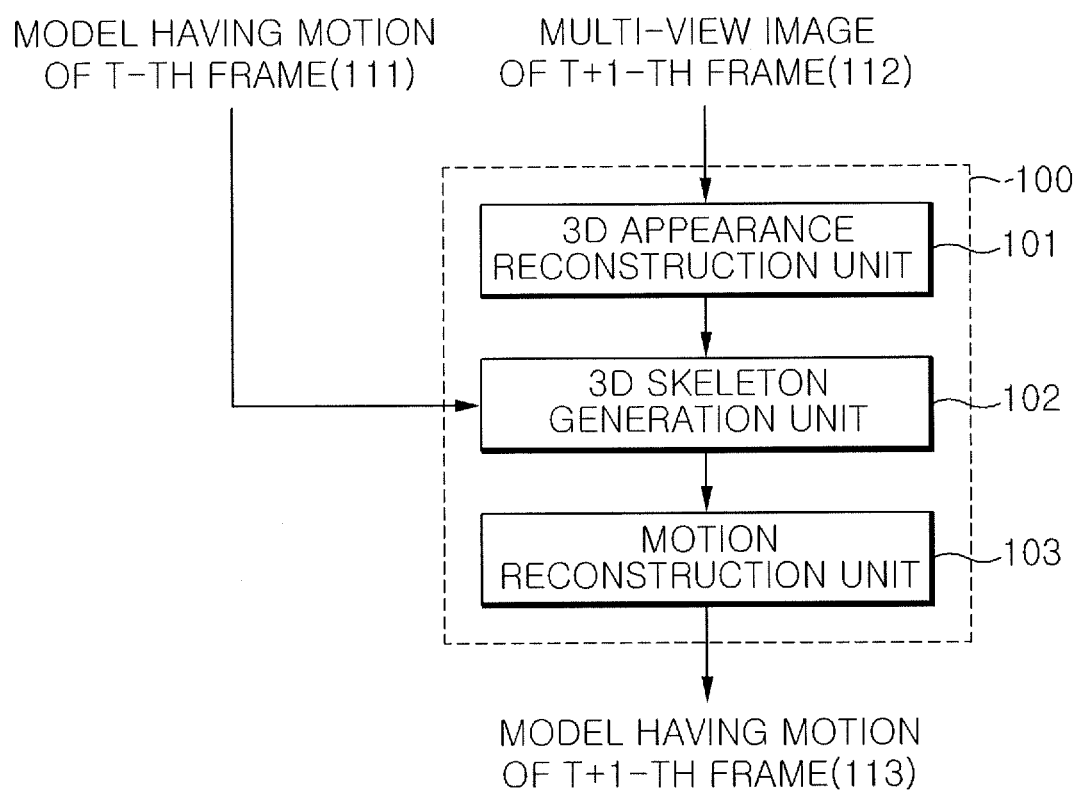
FIG. 1 is a diagram schematically showing a motion capture apparatus according to an embodiment of the present invention.

Reference now should be made to the drawings, in which the same reference numerals are used throughout the different drawings to designate the same or similar components.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

FIG. 1 is a block diagram schematically showing a motion capture apparatus according to an embodiment of the present invention.

In a motion capture apparatus 100 according to an embodiment of the present invention, a model 111 having a motion of a T-th frame and a multi-view image 112 obtained by capturing a relevant entity at a T+1-th frame are given as input. The T-th frame is a frame which is a reference, and the T+1-th frame is a new frame subsequent to the T-th frame.

The model 111 having the motion of the T-th frame is a model in which the motion is aligned with that of the entity in an image with respect to the T-th frame, and is characterized in that the structure of joints may be predefined and the connection between the joints and the model may be predefined. A procedure for predefining the connection between the joints and the model is called a rigging procedure. The appearance of the model 111 may be manufactured by a designer or manufactured using scanned data. Alternatively, the appearance may be manufactured using information automatically reconstructed from an image using a vision algorithm. Furthermore, the rigging procedure may be manually implemented by a designer, or automatically implemented using technology such as an automatic rigging algorithm or human body automatic transition.

When the motion capture apparatus 100 according to the embodiment of the present invention is used for the given input in this way, a model 113 having a motion of the T+1-th frame is finally derived as output. When motion capture is repeatedly performed using the motion capture apparatus 100, it is possible to reconstruct motions for all frames.

Referring to FIG. 1, the motion capture apparatus 100 according to the embodiment of the present invention may include a 3D appearance reconstruction unit 101, a 3D skeleton generation unit 102, and a motion reconstruction unit 103. The motion capture apparatus 100 of FIG. 1 corresponds to only an embodiment, all blocks shown in FIG. 1 are not essential components, and some blocks may be added, modified or deleted in other embodiments.

The 3D appearance reconstruction unit 101 reconstructs the 3D appearance of the entity using the multi-view image 112 obtained by capturing the entity at the T+1-th frame. The 3D appearance reconstruction unit 101 can reconstruct the geometric shape of the 3D appearance using the multi-view image 112 at the T+1-th frame on the basis of a volume using voxels or on the basis of entity points exist in a 3D space. In an embodiment, the 3D appearance reconstruction unit 101 sets a portion of the multi-view image 112 corresponding to the area of the entity to a foreground, separates the foreground from a background, aggregates pieces of information about the silhouettes and information about the matching of colors of the foreground and the background, and then reconstructs the 3D appearance of the entity.

The 3D skeleton generation unit 102 generates the 3D skeleton of the T+1-th frame using the 3D appearance reconstructed by the 3D appearance reconstruction unit 101 and the model 111 of the entity having the motion of the T-th frame. The skeleton generation procedure performed by the 3D skeleton generation unit 102 is intended to search the 3D appearance for a strong candidate location which may be the location of a joint. The 3D skeleton generated by the 3D skeleton generation unit 102 may have an approximated joint location. Therefore, it is possible to capture a motion based on only the 3D skeleton rather than the 3D appearance of the entity. The detailed construction of the 3D skeleton generation unit 102 according to an embodiment will be described in detail later with reference to related drawings.

The motion reconstruction unit 103 reconstructs the motion of the T+1-th frame by changing the motion of the model 111 based on the 3D skeleton of the T+1-th frame generated by the 3D skeleton generation unit 102. In an embodiment, the motion reconstruction unit 103 searches the 3D skeleton for global feature points enabling a 3D location to be measured, derives the corresponding points of the model 111 matching the global feature points, and changes the motion of the model 111 based on the corresponding points, thus reconstructing the motion of the T+1-th frame of the model 113. The detailed construction of the motion reconstruction unit 103 according to an embodiment will be described in detail later with reference to the related drawings.

Figure 2:
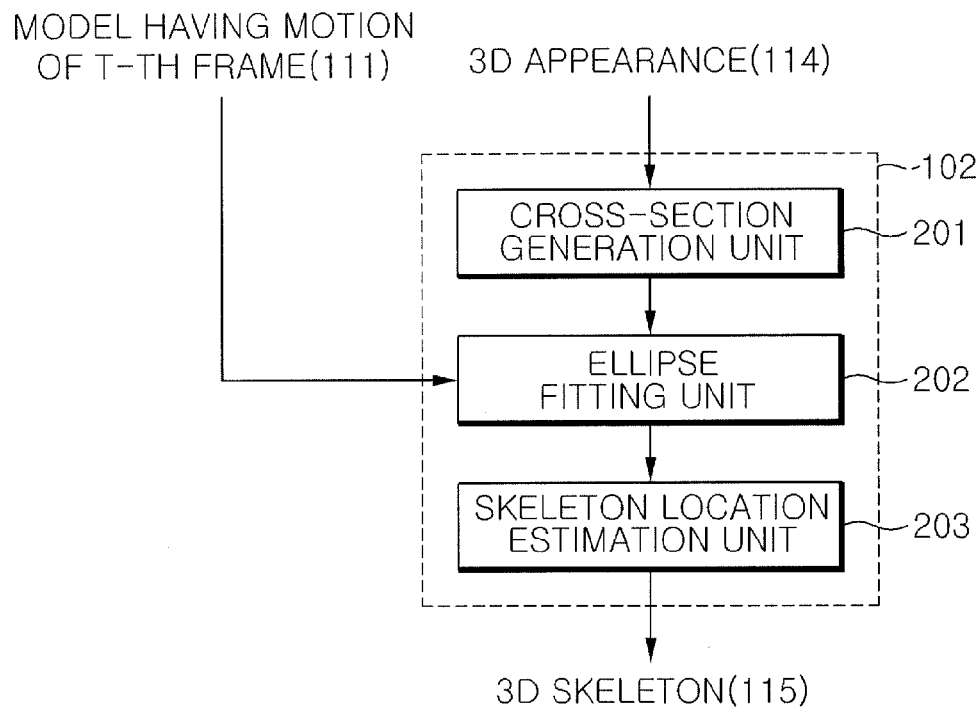
FIG. 2 is a diagram schematically showing the 3D skeleton generation unit of the motion capture apparatus according to an embodiment of the present invention.

FIG. 2 is a block diagram schematically showing the 3D skeleton generation unit of the motion capture apparatus according to an embodiment of the present invention.

Referring to FIG. 2, the 3D skeleton generation unit 102 of the motion capture apparatus according to an embodiment of the present invention includes a cross-section generation unit 201, an ellipse fitting unit 202, and a skeleton location estimation unit 203. The 3D skeleton generation unit 102 of the motion capture apparatus shown in FIG. 2 corresponds to only an embodiment, all blocks shown in FIG. 2 are not essential blocks, and some blocks may be added, modified or deleted in other embodiments.

The cross-section generation unit 201 generates a cross-section of the model 111 of an entity having the motion of the T-th frame and a cross-section of the 3D appearance 114 of the entity in the direction of a normal line relative to the longitudinal direction of the skeleton of the model 111. The cross-section generation unit 201 samples each skeleton of the model 111 having the motion of the T-th frame at regular intervals, and generates a cross-section in the direction of a normal line relative to the longitudinal direction of the skeleton. On the cross-section, the cross-section of the model 111 which is cut along the cross-section and the cross-section of the 3D appearance 114 which is cut along the cross-section are depicted.

The ellipse fitting unit 202 generates an ellipse by elliptically fitting the cross-section of the model.

The skeleton location estimation unit 203 estimates the location of the skeleton of the model 111 by searching for the optimal location of the ellipse on the basis of the cross-section of the 3D appearance 114. The object of the skeleton location estimation unit 203 is to place the cross-section of the model 111 on an optimal location on the basis of the cross-section of the 3D appearance 114. It can generally be assumed that as the cross-section of the model 111 exactly matches the cross-section of the 3D appearance 114, the motion has been correctly estimated. Accordingly, the final location of the skeleton of the model 111 obtained when the cross-section of the model 111 is matched with that of the 3D appearance 114 will be the location of the skeleton estimated from the current cross-section. The skeleton location estimation unit 203 may estimate the location of the skeleton of the model using an optimization technique so as to smoothen the location of the skeleton of the model.

The 3D skeleton generation unit 102 includes the cross-section generation unit 201, the ellipse fitting unit 202, and the skeleton location estimation unit 203, and then obtains a 3D skeleton 115 enabling implicative motion information to be acquired from the 3D appearance 114.

Figure 3:
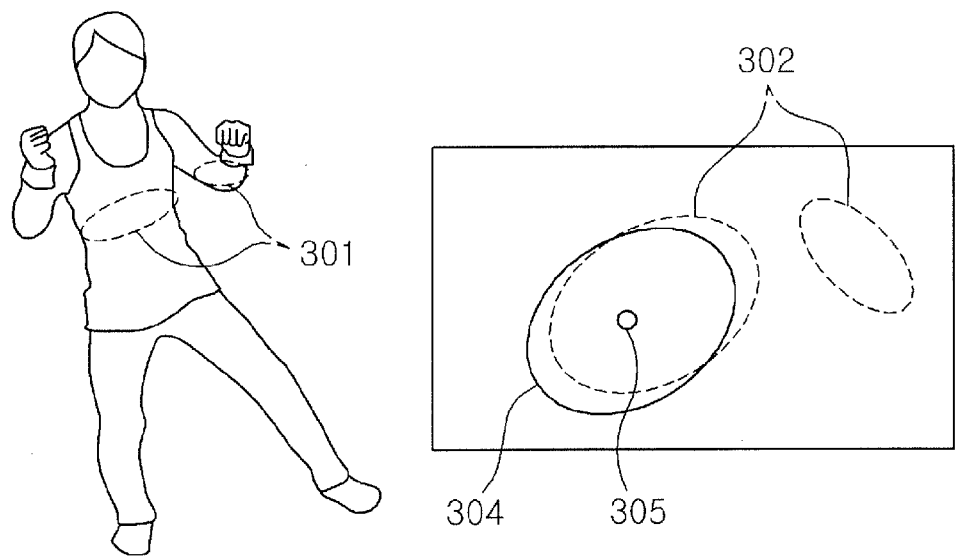
FIG. 3 is a diagram showing an example of a skeleton generation procedure performed by the 3D skeleton generation unit of the motion capture apparatus according to an embodiment of the present invention.

FIG. 3 is a diagram showing an example of a skeleton generation procedure performed by the 3D skeleton generation unit of the motion capture apparatus according to an embodiment of the present invention.

Elliptical dotted line portions 301 in the reconstructed 3D appearance of an entity shown on the left side of FIG. 3 are cross-sections along which the appearance is cut, and images of the cross-sections 301 are shown on the right side of FIG. 3. Here, ellipses 302 indicate results obtained by elliptically fitting the cross-sections of the model at a T-th frame, and an ellipse 304 indicates the cross-section of the 3D appearance at a T+1-th frame. In this case, the location of a skeleton 305 can be estimated by matching the ellipses 302 of the cross-sections of the model at the T-th frame with the cross-section of the 3D appearance at the T+1-th frame. In this case, in order to smoothen the location of the skeleton of the model, the location of the skeleton of the model can be estimated using an optimization technique.

Figure 4:
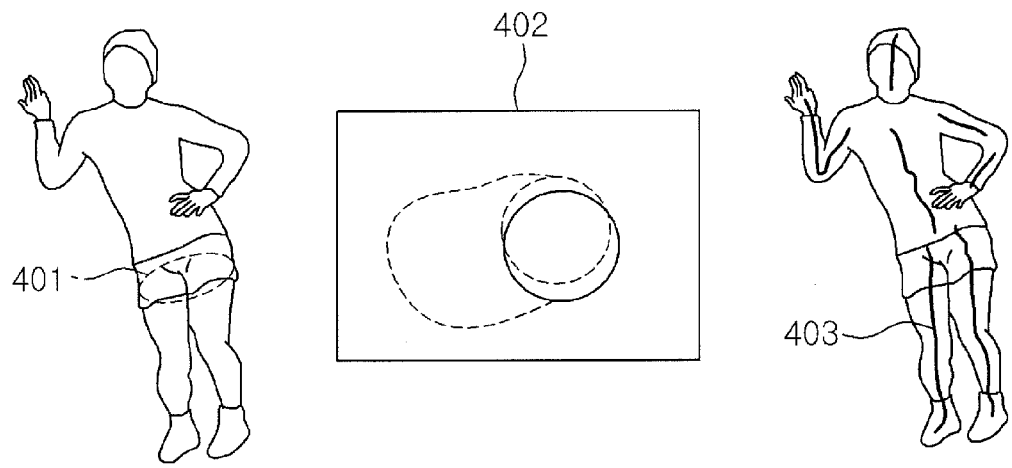
FIG. 4 is a diagram showing another example of a skeleton generation procedure performed by the 3D skeleton generation unit of the motion capture apparatus according to an embodiment of the present invention.

FIG. 4 is a diagram showing another example of a skeleton generation procedure performed by the 3D skeleton generation unit of the motion capture apparatus according to an embodiment of the present invention.

One of the characteristics of skeleton generation performed by the 3D skeleton generation unit of the motion capture apparatus according to the embodiment of the present invention is that it is possible to estimate the correct location of the skeleton even when different physical regions, for example, the hands and the trunk, are connected to each other. That is, it is possible to estimate the correct location of the skeleton using an optimization technique even when the cross-section of a 3D appearance in which individual regions of a body are connected appears, by implementing an approach that tracks the location of the cross-section of the model rather than by simply obtaining the center of gravity of the cross-section of the 3D appearance. This estimation is shown in an image for extracting a skeleton portion of the legs in FIG. 4. A part indicated by an elliptical dotted line 401 on the left side of FIG. 4 indicates a portion cut along the cross-section. An image at the center of FIG. 4 indicates a cross-section image 402. A part 403 composed of lines connected to each other along the center portions of the image on the right side of the drawing indicates the result of generating a skeleton according to the proposed invention.

Figure 5:
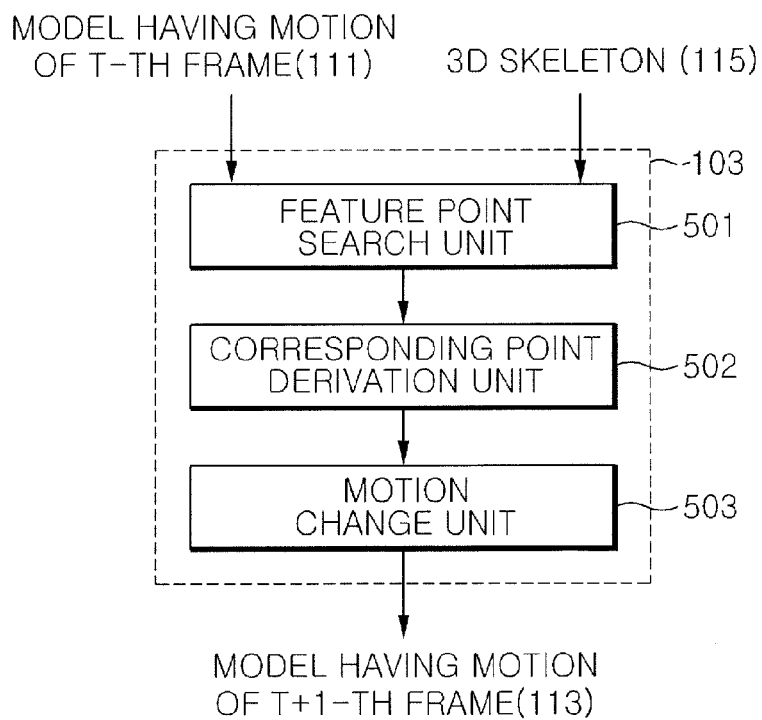
FIG. 5 is a diagram schematically showing the motion reconstruction unit of the motion capture apparatus according to an embodiment of the present invention.

FIG. 5 is a diagram schematically showing the motion reconstruction unit of the motion capture apparatus according to an embodiment of the present invention.

Referring to FIG. 5, the motion reconstruction unit 103 of the motion capture apparatus according to an embodiment of the present invention may include a feature point search unit 501, a corresponding point derivation unit 502, and a motion change unit 503. The motion reconstruction unit 103 of the motion capture apparatus shown in FIG. 5 corresponds to only an embodiment, all blocks shown in FIG. 5 are not essential blocks, and some blocks may be added, modified or deleted in other embodiments.

The feature point search unit 501 searches the 3D skeleton 115 for global feature points enabling a 3D location to be measured. In an embodiment, the global feature points refer to positions at which the 3D location can be accurately predicted because the regions of a body such as the ends, for example, the ends of the head or joints, for example, elbows or knees, are bent to a predetermined degree or more. In this case, the feature point search unit 501 searches the 3D skeleton 115 for joints, which are bent to a predetermined degree or more, as the global feature points.

The corresponding point derivation unit 502 derives the corresponding points of the model 111 matching the global feature points. The corresponding point derivation unit 502 can efficiently reduce unreliability in the tracking of the corresponding points and can more accurately reconstruct motions by deriving the corresponding points of the model 111 on the basis of the global feature points found by the feature point search unit 501. In an embodiment, after the feature point search unit 501 has searched the 3D skeleton 115 for joints, which are bent to a predetermined degree or more, as the global feature points, the corresponding point derivation unit 502 can derive the corresponding points matching the global feature points and can also derive location information about the remaining joints of the entity from the corresponding points. The procedure for deriving corresponding points in this way will be described in detail later with reference to the related drawings.

The motion change unit 503 may finally change the motion of the model based on the corresponding points, thus allowing the motion reconstruction unit 103 to reconstruct the motion of the model. In an embodiment, the motion change unit 503 can change the motion of the model using an optimization algorithm that allows errors in the corresponding points to be minimized.

The motion reconstruction unit 103 derives the model 113 having a motion of the T+1-th frame via the above procedure.

Figure 6:
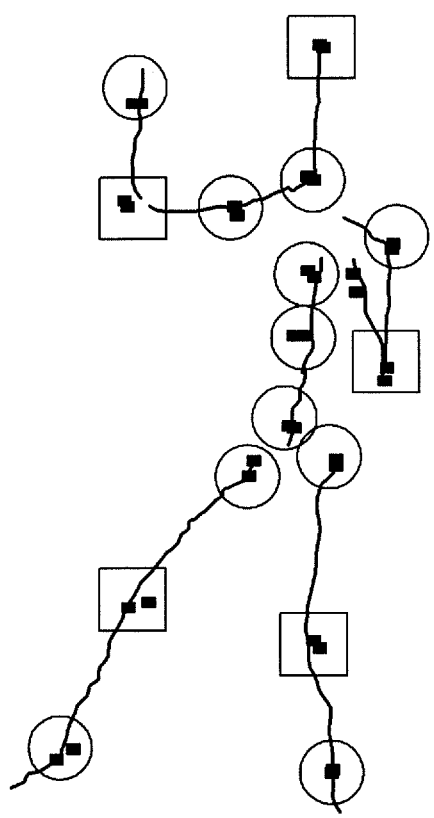
FIG. 6 is a diagram showing an example of a procedure in which the corresponding point derivation unit of the motion capture apparatus derives corresponding points according to an embodiment of the present invention.

FIG. 6 is a diagram showing an example of a procedure in which the corresponding point derivation unit of the motion capture apparatus derives corresponding points according to an embodiment of the present invention.

As described above, after the feature point search unit has searched an entity for joints, which are bent to a predetermined degree or more, as the global feature points, the corresponding point derivation unit can derive the corresponding points matching the global feature points and can also derive location information about the remaining joints of the entity from the corresponding points.

Referring to FIG. 6, points indicated in rectangles are the corresponding points matching the global feature points, and points indicated in circles are the remaining joints of the entity derived from the corresponding points. Because the locations of the joints derived in this way are obtained via the inference of an entire human body compared to the conventional method of finding corresponding points in a localized manner, precision can be improved. Furthermore, since the present invention extracts only a smaller number of corresponding points having higher precision, it is well suited to detecting optimized locations for any kind of motion.

Figure 7:
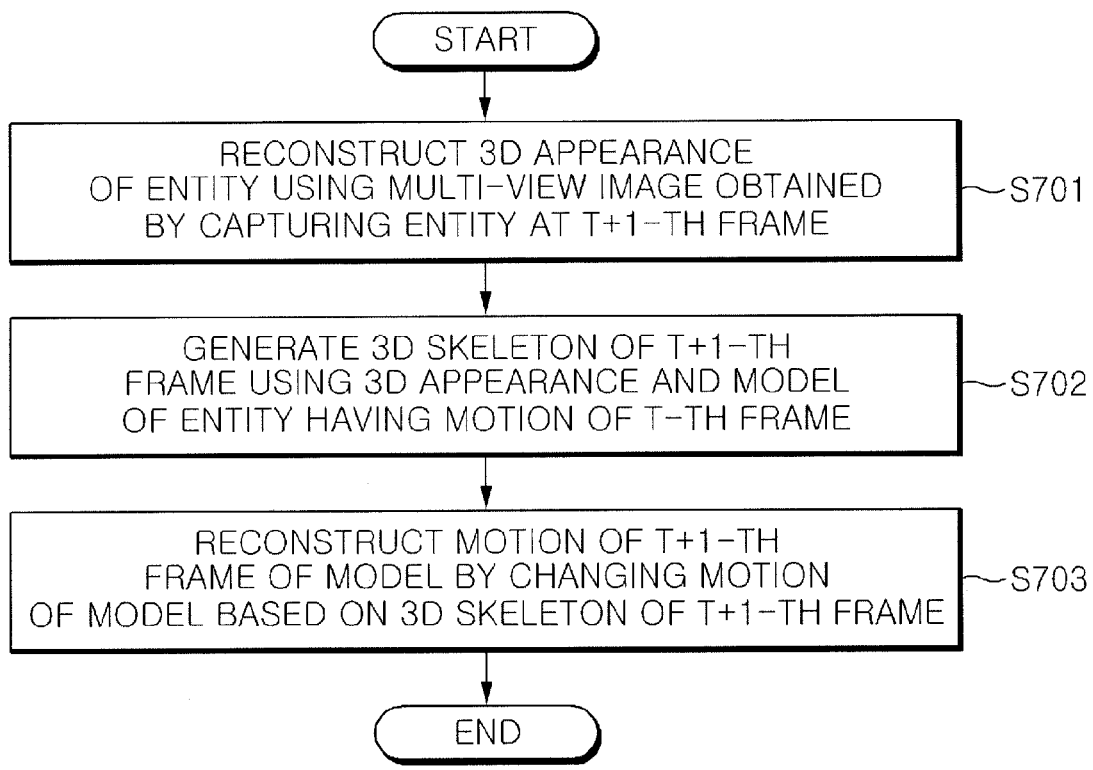
FIG. 7 is a flowchart showing a motion capture method according to an embodiment of the present invention.

FIG. 7 is a flowchart showing a motion capture method according to an embodiment of the present invention.

In the motion capture method according to an embodiment of the present invention, a model having a motion of a T-th frame and a multi-view image obtained by capturing a relevant entity at a T+1-th frame are given as input. The T-th frame is a frame which is a reference, and the T+1-th frame is a new frame subsequent to the T-th frame.

The model having the motion of the T-th frame is a model in which the motion is aligned with that of the entity in an image with respect to the T-th frame, and is characterized in that the structure of joints may be predefined and the connection between the joints and the model may be predefined.

When the motion capture method according to the embodiment of the present invention is used for the given input in this way, a model having a motion of the T+1-th frame is finally derived as output. When motion capture is repeatedly performed using the motion capture method, it is possible to reconstruct motions for all frames.

Referring to FIG. 7, when the motion capture method according to the embodiment of the present invention is initiated, the 3D appearance of the entity is reconstructed using the multi-view image obtained by capturing the entity at the T+1-th frame at step S701. At step S701, a portion of the multi-view image corresponding to the area of the entity is set to a foreground, the foreground is separated from a background, pieces of information about the silhouettes and information about the matching of colors of the foreground and the background are aggregated, and then the 3D appearance of the entity can be reconstructed.

Next, a 3D skeleton of the T+1-th frame is generated using the 3D appearance and the model of the entity having the motion of the T-th frame at step S702. The detailed steps performed at step S702 will be described in detail later with reference to the related drawings.

When the 3D skeleton is generated at step S702, the motion of the T+1-th frame of the model is reconstructed by changing the motion of the model based on the 3D skeleton of the T+1-th frame at step S703. The detailed steps performed at step S703 will be described in detail later with reference to the related drawings.

The motion capture method shown in FIG. 7 performs the motion capture procedure in a manner similar to that of the motion capture apparatus according to the embodiment of the present invention shown in FIG. 1, and thus the description of FIG. 1 is applied to FIG. 7 in the same manner unless special mention is made. Similarly to FIG. 1, all steps of the flowchart in FIG. 7 are not essential steps, and some steps may be added, modified or deleted in other embodiments. Further, the individual steps of the flowchart are not limited to the sequence shown in the drawing, and the sequence may be changed or modified if necessary.

Figure 8:
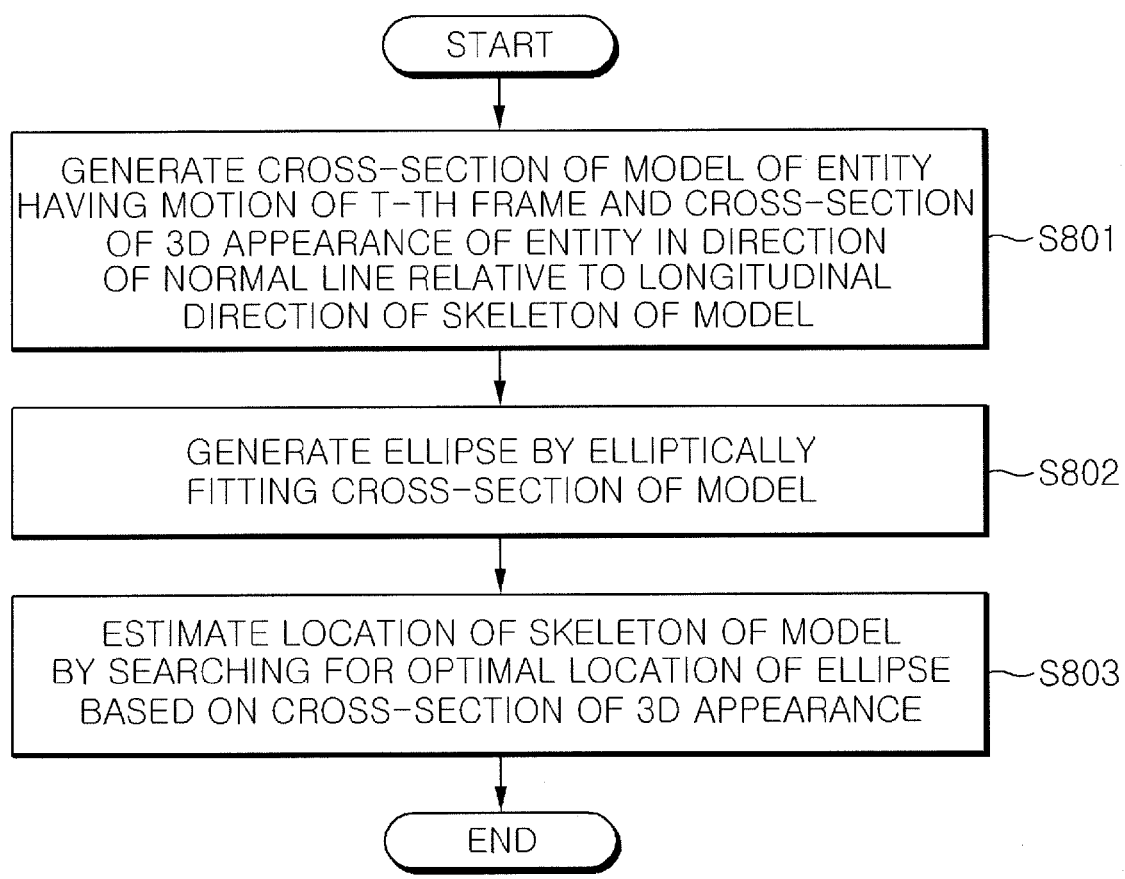
FIG. 8 is a flowchart showing the step of generating a 3D skeleton in the motion capture method according to an embodiment of the present invention.

FIG. 8 is a flowchart showing the step of generating a 3D skeleton in the motion capture method according to an embodiment of the present invention.

The step of generating a 3D skeleton in the motion capture method according to the embodiment of the present invention shown in FIG. 8 corresponds to step S702 of FIG. 7.

Referring to FIG. 8, at the step of generating a 3D skeleton, a cross-section of the model of the entity having the motion of the T-th frame and a cross-section of the 3D appearance of the entity are generated in the direction of a normal line relative to the longitudinal direction of the skeleton of the model at step S801. Next, an ellipse is generated by elliptically fitting the cross-section of the model at step S802, and the location of the skeleton of the model is estimated by searching for the optimal location of the ellipse on the basis of the cross-section of the 3D appearance at step S803.

In this case, at step S803, the location of the skeleton of the model can be estimated using an optimization technique so that the location of the skeleton of the model can be smoothened.

At the step of generating the 3D skeleton shown in FIG. 8, the 3D skeleton generation procedure is performed in a manner similar to that of the 3D skeleton generation unit shown in FIG. 2. Accordingly, the description of FIG. 2 is applied to FIG. 8 in the same manner unless special mention is made. Similarly to FIG. 2, all steps of the flowchart in FIG. 8 are not essential steps, and some steps may be added, modified or deleted in other embodiments. Further, the individual steps of the flowchart are not limited to the sequence shown in the drawing, and the sequence may be changed or modified if necessary.

Figure 9:
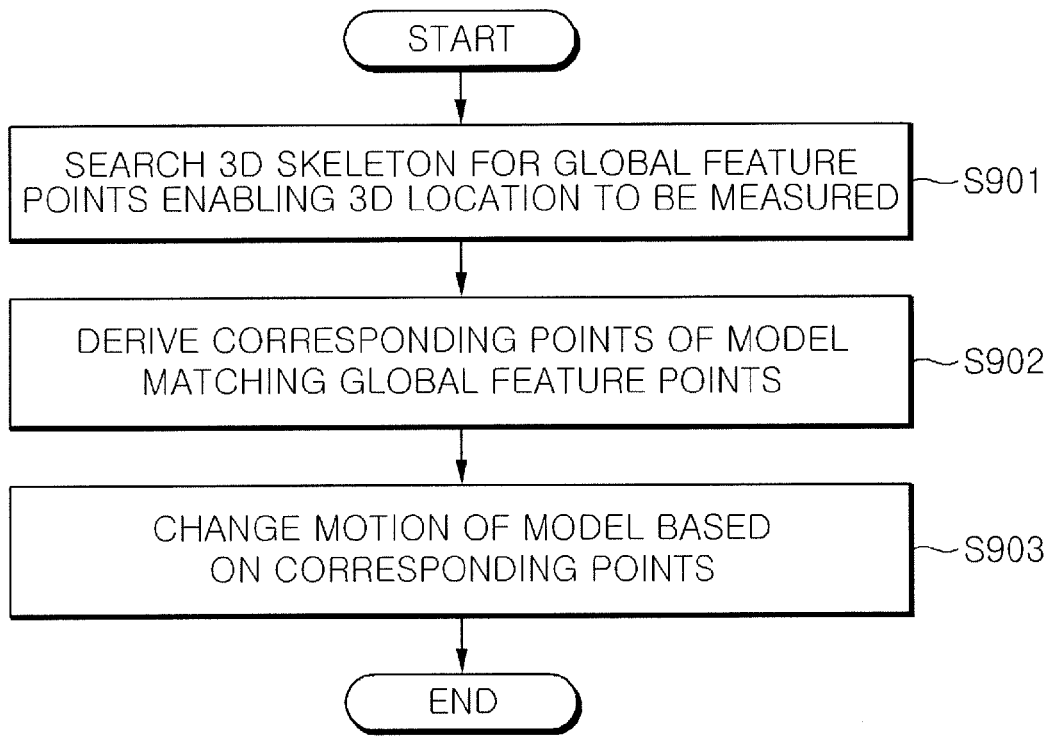
FIG. 9 is a flowchart showing the step of reconstructing motion in the motion capture method according to an embodiment of the present invention.

FIG. 9 is a flowchart showing the step of reconstructing a motion in the motion capture method according to an embodiment of the present invention.

The step of reconstructing the motion in the motion capture method according to the embodiment of the present invention shown in FIG. 9 corresponds to step S703 of FIG. 7.

Referring to FIG. 9, at the step of reconstructing the motion, global feature points that enable a 3D location to be measured are searched for in the 3D skeleton at step S901. Thereafter, the corresponding points of the model matching the global feature points are derived at step S902, and the motion of the model is changed based on the corresponding points at step S903.

In this case, at step S901, joints of the 3D skeleton, which are bent to a predetermined degree or more, can be searched for as the global feature points. Further, at step S902, the corresponding points matching the global feature points can be derived, and location information about the remaining joints of the entity can be derived from the corresponding points.

Furthermore, at step S903, the motion of the model can be changed using an optimization algorithm that causes errors in the corresponding points to be minimized.

At the motion reconstruction step of FIG. 9, the motion reconstruction procedure is performed in a manner similar to that of the motion reconstruction unit of FIG. 5. Accordingly, the description of FIG. 5 is applied to FIG. 9 in the same manner unless special mention is made. Similarly to FIG. 5, all steps of the flowchart shown in FIG. 9 are not essential steps, and some steps may be added, modified or deleted in other embodiments. Further, the individual steps of the flowchart are not limited to the sequence shown in the drawing, and the sequence may be changed or modified if necessary.

According to an aspect of the present invention, there can be provided a motion capture apparatus and method, which generate a 3D skeleton using a reconstructed 3D appearance and information about a previous frame, and search for global feature points, so that the precision of motion reconstruction is improved and the accumulation of errors is reduced, thus enabling complicated motion to be reconstructed and a long sequence of motions to be reconstructed.

The above-described motion capture method has been described with reference to the flowchart presented in the drawing. Although the method has been shown and described using a series of blocks to simplify the description, the present invention is not limited to the sequence of the blocks. Some blocks may be performed in a sequence different from that shown and described in the present specification with respect to other blocks, or may be simultaneously performed. Furthermore, various different branches, flow paths and block sequences that achieve the same or similar results can be implemented. Furthermore, all blocks shown in the drawings to implement the method described in the present specification may not be necessarily required.

Although specific embodiments of the present invention have been illustrated and described, it is apparent to those skilled in the art that the technical spirit of the present invention is not limited by the attached drawings and the above description, and various modifications and changes are possible without departing from the spirit and scope of the present invention. It should be understood that these modifications are included in the claims of the present invention without departing from the spirit of the invention.

What is claimed is:

1. A motion capture apparatus, comprising:
 a three-dimensional (3D) appearance reconstruction unit for reconstructing a 3D appearance of an entity using a multi-view image obtained by capturing the entity at a T+1-th frame;
 a 3D skeleton generation unit for generating a 3D skeleton of the T+1-th frame using the 3D appearance and a model of the entity having a motion of a T-th frame; and
 a motion reconstruction unit for reconstructing a motion of the T+1-th frame of the model by changing the motion of the model based on the 3D skeleton of the T+1-th frame,
 wherein the 3D skeleton generation unit comprises:
 a cross-section generation unit for generating a cross-section of the model of the entity having the motion of the T-th frame and a cross-section of the 3D appearance of the entity in a direction of a normal line relative to a longitudinal direction of a skeleton of the model of the entity;
 an ellipse fitting unit for generating an ellipse by elliptically fitting the cross-section of the model; and
 a skeleton location estimation unit for searching for an optimal location of the ellipse based on the cross-section of the 3D appearance, thus estimating a location of the skeleton of the model.

2. The motion capture apparatus of claim 1, wherein the 3D appearance reconstruction unit sets a portion of the multi-view image corresponding to an area of the entity to a foreground, separates the foreground from a background, aggregates pieces of information about silhouettes and information about matching of colors of the foreground and the background, and then reconstructs the 3D appearance of the entity.

3. The motion capture apparatus of claim 1, wherein the model is configured such that structures of joints are predefined, and connections between the joints and the model are predefined.

4. The motion capture apparatus of claim 1, wherein the motion reconstruction unit comprises:
 a feature point search unit for searching the 3D skeleton for global feature points that enable a 3D location to be measured;
 a corresponding point derivation unit for deriving corresponding points of the model matching the global feature points; and
 a motion change unit for changing the motion of the model based on the corresponding points.

5. The motion capture apparatus of claim 4,
 wherein the feature point search unit searches the 3D skeleton for joints, which are bent to a predetermined degree or more, as the global feature points.

6. The motion capture apparatus of claim 5, wherein the corresponding point derivation unit derives the corresponding points matching the global feature points, and derives location information about remaining joints of the entity from the corresponding points.

7. The motion capture apparatus of claim 4, wherein the motion change unit changes the motion of the model using an optimization algorithm that causes errors in the corresponding points to be minimized.

8. The motion capture apparatus of claim 1, wherein the skeleton location estimation unit estimates the location of the skeleton of the model using an optimization technique so as to smoothen the location of the skeleton of the model.

9. A motion capture method, comprising:
reconstructing a three-dimensional (3D) appearance of an entity using a multi-view image obtained by capturing the entity at a T+1-th frame;
generating a 3D skeleton of the T+1-th frame using the 3D appearance and a model of the entity having a motion of a T-th frame; and
reconstructing a motion of the T+1-th frame of the model by changing the motion of the model based on the 3D skeleton of the T+1-th frame,
wherein the generating the 3D skeleton comprises:
generating a cross-section of the model of the entity having the motion of the T-th frame and a cross-section of the 3D appearance of the entity in a direction of a normal line relative to a longitudinal direction of a skeleton of the model of the entity;
generating an ellipse by elliptically fitting the cross-section of the model; and
searching for an optimal location of the ellipse based on the cross-section of the 3D appearance, thus estimating a location of the skeleton of the model.

10. The motion capture method of claim 9, wherein the reconstructing the 3D appearance comprises setting a portion of the multi-view image corresponding to an area of the entity to a foreground, separating the foreground from a background, aggregating pieces of information about silhouettes and information about matching of colors of the foreground and the background, and then reconstructing the 3D appearance of the entity.

11. The motion capture method of claim 9, wherein the model is configured such that structures of joints are predefined, and connections between the joints and the model are predefined.

12. The motion capture method of claim 9, wherein the reconstructing the motion comprises:
searching the 3D skeleton for global feature points that enable a 3D location to be measured;
deriving corresponding points of the model matching the global feature points; and
changing the motion of the model based on the corresponding points.

13. The motion capture method of claim 12, wherein the searching for the global feature points comprises searching the 3D skeleton for joints, which are bent to a predetermined degree or more, as the global feature points.

14. The motion capture method of claim 13, wherein the deriving the corresponding points comprises:
deriving the corresponding points matching the global feature points; and
deriving location information about remaining joints of the entity from the corresponding points.

15. The motion capture method of claim 12, wherein the changing the motion comprises changing the motion of the model using an optimization algorithm that causes errors in the corresponding points to be minimized.

16. The motion capture method of claim 12, wherein the estimating the location of the skeleton comprises estimating the location of the skeleton of the model using an optimization technique so as to smoothen the location of the skeleton of the model.

* * * * *